Patented Oct. 18, 1949

2,485,277

UNITED STATES PATENT OFFICE 2,485,277

METHOD OF PRODUCING CLEAR, BUBBLE-FREE CASTINGS BY POLYMERIZING MONOMERIC VINYLIDENE COMPOUNDS IN THE PRESENCE OF NITRIC OXIDE

Harry Gilbert, Akron, Ohio, assignor to The B. F. Goodrich Company, New York, N. Y., a corporation of New York No Drawing. Application December 21, 1946, Serial No. 717,805

10 Claims. (Cl. 260—88.7)

This invention relates to the casting of synthetic resins, more particularly to the production of castings from liquid monomeric vinylidene compounds as by the direct homogeneous or mass polymerization method, in which the monomeric material is polymerized in the absence of added solvents or diluents and in the presence or absence of small amounts of other substances such as catalysts, etc. The principal object of the invention is to provide a method whereby such liquid monomeric polymerizable compounds may be polymerized to produce castings of optical clarity free from bubbles, shrinkage blemishes and other defects.

In the casting of liquid polymerizable vinylidene compounds, especially esters of alpha-substituted acrylic acids such as methyl methacrylate, many difficulties have been encountered, particularly when the casting is effected by the homogeneous or mass polymerization method principally because of the facility with which these compounds undergo polymerization and the extremely exothermic nature of the polymerization reaction involved. For example, the heat liberated on polymerization of methyl methacrylate is 80 cal. per gram. As a result of this heat liberation, the polymerization of such materials as methyl methacrylate, methyl alpha-cyano acrylate and the like is often so highly erratic, even under carefully controlled conditions, that "hot-spots" are developed with such rapidity that the heat of reaction cannot be dissipated before small amounts of the volatile monomeric materials are vaporized, and bubbles are permanently formed in the rapidly thickening polymerization mixture. These "hot-spots" also cause marks on the surfaces of the casting since the monomeric material generally shrinks when polymerized. Moreover, when polymerization is uneven so as to produce "hot-spots," the localized contraction also causes small "finger lines" to appear in the surface of the casting and other blemishes to appear in the interior of the casting so that its transparency is seriously impaired.

Various methods have been employed in the past to eliminate one or more of these difficulties. These involve such expedients as carefully regulating the heating; casting the object in superimposed layers; retarding the polymerization at the edges of the mold by treating the surfaces of the mold with an inhibitor; casting in layers of different viscosities containing successively diminishing amounts of catalysts; and applying heat to only the lower end of a mold in which the monomer is subjected to pressure. None of these methods, however, make possible a single-stage casting of objects having large cross sections, for instance of the order of 6 inches or more, which are of optical clarity and free of internal shrinkage strains and bubbles. It is, accordingly, present practice to cast a solution of polymerized methyl methacrylate in methyl methacrylate monomer rather than to attempt casting directly from the monomer.

I have now discovered, however, that liquid polymerizable vinylidene compounds, and particularly the esters of alpha-substituted acrylic acids such as methyl methacrylate, may be used to form excellent castings directly from the monomer if a small proportion of nitric oxide (NO) gas is incorporated or dissolved in the monomeric material before polymerization or if a nitric oxide generating substance such as an alkyl nitrite is added to the monomer before polymerization. A smooth polymerization reaction may then be effected by heating the monomer below its boiling point in the presence of a normal amount of polymerization-promoting substances or catalysts including the conventional peroxygen compounds such as benzoyl peroxide and the like. The resins obtained by this method are clear and water white, are remarkably free from blemishes, bubbles and shrinkage strains but have all the physical properties of cast resins made by more conventional methods.

It is quite surprising that nitric oxide, a gaseous material, should prevent the formation of bubbles during casting since bubble formation is generally associated with the transformation of monomeric material in to the vaporized or gaseous form. Nevertheless, the presence of this substance has been found to regulate the polymerization so that excellent castings free from bubbles and blemishes and of optical clarity are formed. This latter result is often not secured, however, when solid polymerization inhibitors such as phenols and amines are added. Rather the presence of such substances frequently causes the casting to be colored.

The amount of nitric oxide which is incorporated or dissolved in the monomeric material prior to polymerization is not critical. When nitric oxide gas is bubbled into methyl methacrylate or other liquid monomeric compounds, a blue color develops which, however, disappears when the casting mixture is heated to 60 or 70° C. indicating that the excess nitric oxide is given off. It appears that the very small amount of nitric oxide (N=O) which is soluble in the monomer at the elevated casting temperature is sufficient to control the polymerization until the polymerization has progressed to the point where volatilization of the monomer no longer takes place and an even polymerization occurs across the thick cross section. Thus, the concentration of nitric oxide appears to be automatically adjusted so that a controlled but nevertheless rapid polymerization occurs.

The following examples illustrate certain specific manners in which the nitric oxide may be incorporated in the monomeric materials and demonstrate the production of illustrative castings from certain preferred monomeric materials.

*Example I*

Methyl methacrylate polymerizes to hard, clear, glass-like substances which are especially useful in certain molded goods such as brush handles, picture frames, bomber noses and the like, optical pieces such as lenses, prisms, etc., and other uses where exceptional clarity and transparency are desired. Methyl methacrylate polymerizes with such facility that it is customary to store and ship it with added small quantities of non-volatile inhibitors such as hydroquinone, phenolic substances and the like. Consequently, it is customary to distill the methyl methacrylate just before use in polymerization. In the present example it was demonstrated that nitric oxide could be incorporated in the monomer during distillation and it was found that the inhibiting action of the nitric oxide was sufficient to prevent polymerization until the monomer could be utilized in polymerization.

A 100 ml. sample of monomeric methyl methacrylate was distilled at atmospheric pressure in the presence of a constant stream of nitric oxide gas. The nitric oxide gas (NO) was introduced into the distillation flask at a point one inch above the top of the boiling monomer. A 5 gram sample of the distillate and 5 milligrams of benzoyl peroxide were added to a glass vial. The vial was loosely stoppered and immersed in a water bath maintained at 60° C. for 2 hours. At the end of the heating period, the sample was removed and found to be colorless, clear and transparent, hard and entirely free from both exterior and interior imperfections.

*Example II*

A constant stream of nitric oxide (NO) was bubbled through a 5 gram sample of monomeric methyl methacrylate for one minute. Then 5 milligrams of benzoyl peroxide were added to the monomer and dissolved by mild heating and stirring. The catalyzed monomer was placed in a loosely stoppered glass vial and suspended in a water bath at 60° C. for 2 hours. At the end of the heating period the glass vial was broken away from the casting and the casting was found to be hard, clear, colorless and entirely free from all imperfections.

A control casting was made by dissolving 0.1% benzoyl peroxide in 5 grams of a freshly distilled, nitric oxide free methyl methacrylate monomer. After heating for 2 hours at 60° C. in a glass vial as above, the control casting was found to be marred by a number of bubbles near the vial walls and at the top of the casting. Moreover, the control casting had many "finger lines" over the surface of the casting which destroyed its transparency and clarity.

*Example III*

A 10 gram sample of freshly distilled monomeric methyl methacrylate was placed in a glass vial and 5 milligrams of isoamyl nitrite were added. Benzoyl peroxide (0.1%) was added to the monomer and the tube was warmed and shaken until a clear solution was obtained. After heating for 2 hours at 60° C., the polymer was found to be colorless, clear and transparent, hard, and entirely free from imperfections.

*Examples IV to IX*

Each of the above examples was twice repeated using methyl alpha-cyano acrylate and ethyl alpha-cyano acrylate in place of methyl methacrylate. Benzoyl peroxide in the amount of 0.1% was used as the catalyst. Polymerization for 2 hours at 60° C. produced castings of extreme clarity and hardness, and freedom from surface irregularities. In all castings the hardness and other physical properties were equivalent in all respects to castings produced without nitric oxide, which, however, contained imperfections due to bubble formation.

Liquid monomeric vinylidene compounds containing nitric oxide or nitric oxide generating substances, it was found, may be stored in iron drums for a week or a month or more without suffering noticeable polymerization, providing the drums are tightly sealed against escape of nitric oxide. Thus, when practicing this invention, monomer, as received, containing small amounts of non-volatile inhibitor may be distilled in the presence of nitric oxide and kept for sometime until actually needed for polymerization, if desired.

The present invention has been specifically illustrated hereinabove with relation to the production of castings by mass polymerization of certain liquid polymerizable esters of alpha-substituted acrylic acid. Such esters polymerize rapidly to form hard glass-like polymers especially desirable for their clarity and transparency but difficulties due to bubble formation are pronounced. Hence, the invention is of particular importance in the casting of these compounds. It is to be understood, however, that the invention is applicable generally to the polymerization of liquid polymerizable vinylidene compounds, that is, compounds containing the vinylidene, $$CH_2=C<$$

structure; and that the esters of alpha-substituted acrylic acids comprise but one subgenus of vinylidene compounds.

Typical examples of esters of alpha-substituted acrylic acids which may be used include the following:

Methyl methacrylate
Ethyl ethacrylate
Butyl methacrylate
Isobutyl methacrylate
Secondary butyl methacrylate
Tertiary amyl methacrylate
Phenyl methacrylate
Glycol monomethacrylate
Glycol dimethacrylate
Cyclohexyl methacrylate
Para-cyclohexylphenyl methacrylate
Decahydro-beta-naphthol methacrylate
Di-isopropyl carbinol methacrylate
Furfuryl methacrylate
Methallyl methacrylate
Tetrahydrofurfuryl methacrylate Methyl ethacrylate
Ethyl alpha-butyl acrylate
Ethyl alpha-chloro acrylate
Ethyl alpha-cyano acrylate
Methyl alpha-cyano acrylate
Methyl alpha-methoxy acrylate
Dimethyl itaconate (which may be called methyl alpha-carbomethoxy methyl acrylate)

It will be noted that the alpha-substituent in these esters may be an alkyl radical, a halogen atom, a cyano radical, an alkoxy radical, a substituted alkyl radical or the like.

Polymerizable vinyl compounds comprise another subgenus of polymerizable vinylidene compounds and may also be used in this invention, particularly those that polymerize to form hard resins such as styrene, mono and dichloro styrenes, p-methyl styrene, divinyl benzene, vinyl naphthalene, methyl vinyl ketone, glycol diacrylate, acrylonitrile, vinyl acetate, vinyl butyrate, etc. The invention is also applicable to the polymerization of vinyl compounds which polymerize to give softer rubbery polymers and is advantageous in that mass polymerization of such monomers is more easily controlled and may be accomplished in equipment having ordinary heat transfer provisions. Examples of such compounds include methyl, ethyl and butyl acrylate, vinyl methyl ether, isoprene, etc., vinyl compounds which are gaseous instead of liquid such as vinyl chloride, isobutylene etc., may also be polymerized in the presence of nitric oxide if sufficient pressure is supplied to liquefy the monomers.

Still another subclass of polymerizable vinylidene compounds includes the allyl compounds, particularly the polyallyl esters. Such esters are rather viscous liquids and are used extensively in producing clear, hard, non-thermoplastic castings. Although they do not polymerize as rapidly as do methacrylate esters and the like, difficulty is experienced in producing flawless castings and their polymerization may be controlled by the presence of nitric oxide. Examples of such compounds include diallyl phthalate, diallyl sebacate, triallyl phosphate, diallyl dicarbonate esters of dihydric alcohols and phenols and the like.

Still other liquid polymerizable vinylidene compounds not falling within the above subclasses which may be used in this invention include alpha-methyl styrene, methacrylonitrile, vinylidene chloride, methyl isopropenyl ketone and the like. All of the above-mentioned polymerizable vinylidene compounds may be polymerized alone or mixtures of two or more such compounds may be polymerized to yield copolymers.

Coloring matter, either soluble or insoluble, plasticizers, and various modifiers, catalysts and the like, may be incorporated in the liquid monomeric materials to be polymerized either before or after incorporation of the nitric oxide. However, nitric oxide addition must not be delayed until the polymerization reaction has proceeded far enough that the viscosity of the mixture has greatly increased whereby it will be difficult to introduce the nitric oxide. Moreover, the polymerization of the preferred materials of this invention have a tendency to be auto-catalytic and it is desirable that the nitric oxide be present at all times to counteract this tendency.

In the specific examples benzoyl peroxide was used in the polymerization. For castings of extreme clarity it is desired that the peroxide be recrystallized at least once and ground to 100 mesh before use. The concentration of this catalyst is generally below 0.20 to 0.25% and is preferably about 0.1 to .2%. The amount of catalyst will vary slightly with the particular monomer or monomeric mixture. Other per-oxygen type catalysts may be used with equal facility in this invention, for example, acetyl peroxide, acetyl benzoyl peroxide, caprylyl peroxide, silver peroxide, the persulfates, the perborates, percarbonates, and others.

The temperature to which the polymerizable vinylidene compound is heated to effect polymerization will also vary depending on the particular monomers used. Ordinarily, however, this temperature is within the range of 50 to 100° C., and at any event is below the boiling point of the monomer. The monomers preferably used generally possess boiling points above 100° C.

While I have disclosed certain preferred manners of performing my invention, I do not thereby desire or intend to limit myself solely thereto, for the precise proportions of the materials utilized may be varied and equivalent chemical materials may be employed if desired without departing from the spirit and scope of the appended claims.

I claim:

1. The method of producing clear, smooth-surfaced, bubble-free castings from a liquid monomeric vinylidene compound polymerizable to a solid polymer which comprises incorporating nitric oxide in said vinylidene compound, shaping said nitric-oxide containing vinylidene compound and then heating the nitric oxide containing vinylidene compound to a temperature below its boiling point.

2. The method of producing clear, smooth-surfaced and bubble-free castings from a liquid monomeric vinylidene compound polymerizable to a solid polymer which comprises incorporating a nitric oxide generating substance in said monomeric compound, shaping said nitric-oxide containing vinylidene compound and then heating said monomeric compound to a temperature below its boiling point.

3. The method of producing clear, smooth-surfaced and bubble-free castings from a liquid monomeric vinylidene compound polymerizable to a solid polymer which comprises incorporating nitric oxide in said vinylidene compound, incorporating a per-oxygen polymerization catalyst in the nitric oxide containing vinylidene compound, shaping said nitric-oxide containing vinylidene compound and then heating the vinylidene compound to a temperature below its boiling point.

4. The method of producing clear, smooth-surfaced and bubble-free castings from a liquid monomeric ester of an alpha-substituted acrylic acid which comprises incorporating nitric oxide in said monomeric ester, shaping said nitric-oxide containing ester and then heating said nitric oxide containing monomeric ester to a temperature below its boiling point.

5. The method of producing clear, smooth-surfaced and bubble-free castings from a liquid monomeric ester of methacrylic acid which comprises incorporating a nitric oxide generating substance in said monomeric ester, incorporating a per-oxygen polymerization catalyst in said nitric oxide containing monomeric ester, shaping said nitric-oxide and catalyst containing ester and heating said monomeric ester to a temperature of 50 to 100° C.

6. The method of producing clear, smooth-surfaced and bubble-free castings from monomeric methyl methacrylate, which method comprises incorporating nitric oxide in said monomeric methyl methacrylate, shaping said nitric-oxide containing methyl methacrylate and heating said monomeric methyl methacrylate to a temperature of 50 to 100° C.

7. The method of producing clear, smooth-surfaced and bubble-free castings from monomeric methyl methacrylate, which method comprises incorporating nitric oxide in said monomeric methyl methacrylate, incorporating benzoyl peroxide in said monomeric methyl methacrylate, shaping said nitric-oxide containing methyl methacrylate and heating said monomeric methyl methacrylate to a temperature of 50 to 100° C.

8. The method of producing clear, smooth-surfaced and bubble-free castings from a monomeric ester of alpha-cyano acrylic acid which comprises incorporating nitric oxide in said monomeric ester, shaping said nitric-oxide containing ester and heating said monomeric ester to a temperature below its boiling point.

9. The method of producing clear, smooth-surfaced and bubble-free castings from monomeric methyl alpha-cyano acrylate, which method comprises incorporating nitric oxide in said methyl alpha-cyano acrylate, incorporating benzoyl peroxide in said monomeric methyl alpha-cyano acrylate, shaping said nitric-oxide containing methyl alpha-cyano acrylate and heating said methyl alpha-cyano acrylate to a temperature of 50 to 100° C.

10. The method of producing clear, smooth-surfaced and bubble-free castings from monomeric ethyl alpha-cyano acrylate, which method comprises incorporating nitric oxide in said ethyl alpha-cyano acrylate, incorporating benzoyl peroxide in said monomeric ethyl alpha-cyano acrylate, shaping said nitric-oxide containing ethyl alpha-cyano acrylate and heating said ethyl alpha-cyano acrylate to a temperature of 50 to 100° C.

HARRY GILBERT.

No references cited.